United States Patent [19]

Adams

[11] Patent Number: 5,121,807
[45] Date of Patent: Jun. 16, 1992

[54] POWER ASSISTED VEHICLE STEERING SYSTEM

[75] Inventor: Frederick J. Adams, Avon, Great Britain

[73] Assignee: TRW Cam Gears Limited, Avon, Great Britain

[21] Appl. No.: 609,201

[22] Filed: Nov. 5, 1990

[30] Foreign Application Priority Data

Nov. 22, 1989 [GB] United Kingdom ............ 8926422

[51] Int. Cl.$^5$ ............................................. B62D 5/06
[52] U.S. Cl. ............................... 180/143; 180/142; 91/437
[58] Field of Search ............ 180/143, 141, 132, 162; 74/388 PS; 91/437; 60/368

[56] References Cited

U.S. PATENT DOCUMENTS

| | | | |
|---|---|---|---|
| 4,311,161 | 1/1982 | Narumi et al. | 180/143 X |
| 4,601,358 | 7/1986 | Kozuka et al. | 180/143 X |
| 4,607,717 | 8/1986 | Nakayama | 180/141 |
| 4,629,025 | 12/1986 | Brasier et al. | 180/142 |
| 4,681,184 | 7/1987 | Suzuki et al. | 180/141 |
| 4,702,335 | 10/1987 | Cage et al. | 180/143 X |
| 4,901,812 | 2/1990 | Ferguson | 180/143 X |
| 4,923,170 | 5/1990 | Takaoka et al. | 180/143 X |
| 4,958,695 | 9/1990 | Uchida et al. | 180/143 X |

Primary Examiner—Charles A. Marmor
Assistant Examiner—Kevin Hurley
Attorney, Agent, or Firm—Tarolli, Sundheim & Covell

[57] ABSTRACT

A power assisted vehicle steering system of the speed responsive kind has a ram 6 fluid flow to chambers 4 and 5 of which from a pump 9 is directed by an open center steering valve 1. Communication between the chambers 4 and 5 is permissible through a by-pass valve 13 adjustable by a solenoid 17 in response to vehicle speed to open such communication as speed increases (and thereby decrease power assistance) and vice versa. The valve 13 has a spool 22 which is spring loaded relative to a control spindle 18 of the solenoid. Adjustment of the spool 22 in response to speed variations opens or closes by-pass ports 14 and 15 to opposite ends of a restrictor 32 which provides such fluid flow communication.

A spring loaded spool 41 in the valve 13 is responsive through chambers 39 and 40 to fluid pressure at opposite sides of the restrictor 32. When the fluid pressure differential across the restrictor 32 exceeds a predetermined differential, the spool 41 is displaced to direct fluid pressure to spool chamber 55. This displaces the spool 22 against its spring biasing 27 and relative to the rod 18 thereby closing the ports 14 and 15 (and communication between the ram chambers) so that increased power assistance becomes available irrespective of the vehicle being at high speed.

14 Claims, 4 Drawing Sheets

POWER ASSISTED VEHICLE STEERING SYSTEM

TECHNICAL FIELD AND BACKGROUND ART

The present invention relates to a power assisted vehicle steering system of the kind in which power assistance to vehicle steering is provided by a fluid pressure operated ram having opposed chambers, fluid flow to which from a pressure source (usually a constant volume output pump) is controlled by a steering valve responsive to a steering input. Fluid flow is controlled to the opposed chambers of the ram to provide a fluid pressure differential therebetween and actuation of the ram to assist in a steering manoeuvre which is intended by the steering input. It is desirable that power assistance which is provided for a steering manoeuvre varies in accordance with changes in vehicle speed whereby as vehicle speed increases the power assistance which is available decreases and vice versa so that, for example, at low vehicle speed maximum power assistance is available to facilitate parking and similar manoeuvres.

A prior proposal for a steering system of the kind mentioned where power assistance is responsive to vehicle speed is disclosed in our Patent Specification G.B. 2,215,684 in which a proportion of fluid flow from a constant volume output pump to the steering valve may be diverted by way of a by-pass to a fluid reservoir. The by-pass includes a valve that is adjustable in response to variations in vehicle speed so that at high vehicle speeds maximum fluid flow is permitted through the by-pass and therefore minimum or zero fluid pressure and power assistance will be provided by the ram while at low vehicle speed a minimum or zero fluid flow is permitted through the by-pass so that the full output and pressure of the pump becomes available to actuate the ram and provide maximum power assistance. It has also been proposed that the by-pass can alternatively be provided to permit fluid flow communication between the opposed chambers of the ram and such communication is controlled by a valve in the by-pass. Again this latter valve is responsive to variations in vehicle speed whereby at high vehicle speeds the by-pass valve permits maximum fluid flow communication between the opposed chambers and thereby minimum or zero power assistance is available while at low vehicle speed the by-pass valve closes or permits minimum fluid flow communication between the opposed chambers for maximum power assistance to be provided by the ram. The present invention is particularly concerned with steering systems of this latter type and has as an object to provide means whereby at relatively high vehicle speeds (where small or no power assistance would normally be available) increased or maximum power assistance can be made available during steering manoeuvres which may be regarded as exceptional at such speeds, for example as may be experienced during the application of a rapid and large steering input torque in steering to evade a hazardous condition.

STATEMENT OF INVENTION AND ADVANTAGES

According to the present invention there is provided a power assisted vehicle steering system comprising a fluid pressure operated ram having opposed chambers and operable to provide assistance to vehicle steering; steering valve means responsive to a steering input and controlling fluid flow from a pressure source thereof to said opposed chambers to provide a fluid pressure differential therebetween and actuate the ram for assisting in a steering manoeuvre intended by the steering input; a by-pass capable of providing fluid flow communication between said opposed chambers and by-pass valve means controlling said fluid flow communication, said by-pass valve means being adjustable in response to variations in vehicle speed to increase said fluid flow communication as vehicle speed increases and to decrease said fluid flow communication as vehicle speed decreases, and wherein said by-pass valve means is responsive to the fluid pressure differential between the opposed chambers whereby when a predetermined fluid pressure differential is exceeded the by-pass valve means reacts, independently of its adjustment in response to vehicle speed, in a sense to decrease fluid flow communication between the opposed chambers.

The system of the present invention will typically have a fluid pressure source provided by an engine driven constant volume pump the output from which is controlled by adjustment of a conventional steering valve of the type which is open centre and open return (with respect to the ram chambers) in its neutral condition to connect the opposed chambers respectively to fluid pressure or fluid return (the reservoir) as appropriate for actuation of the ram to provide power assistance. The fluid flow communication permitted through the by-pass between the opposed ram chambers is controlled by the by-pass valve means in response to changes in vehicle speed to provide the required variations in power assistance which is available. The control of the by-pass valve means is conveniently effected by an electric stepper motor or solenoid which is responsive to a vehicle speed sensor. Usually the control of the by-pass valve means will provide zero or minimum fluid flow communication between the opposed chambers over a low vehicle speed range so that maximum fluid pressure is provided to the ram and thereby maximum power assistance is available for steering manoeuvres at such low speeds. As vehicle speed is increased beyond the aforementioned low speed range the by-pass valve may progressively increase fluid flow communication between the opposed ram chambers and thereby progressively decrease the power assistance which is available so that, above a vehicle speed of say 80 kph, minimum or zero power assistance is provided. Under these latter conditions it is possible that circumstances will arise, for example when attempting to avoid a road hazard, where power assistance is desirable to assist in a high speed steering manoeuvre. In such circumstances and by the present invention it is envisaged that when a large steering input torque is rapidly applied to the steering valve means this valve will react (open) to direct the maximum fluid flow output from the pump to one of the ram chambers thereby instantaneously creating a large pressure differential between the opposed chambers. With a vehicle at high speed the by-pass valve means will permit maximum fluid flow communication between the ram chambers and thereby the aforementioned large pressure differential will dissipate, however the by-pass valve means is arranged to respond to that instantaneous pressure differential when it exceeds a predetermined magnitude in a sense which decreases the fluid flow communication that is permitted between the opposed chambers and independently of the adjustment of the by-pass valve means which is effected in response to vehicle speed. Consequently an increased, and possibly a maximum, power assistance is availably by the ram for the high speed steering manoeuvre. In comparison, normal high speed steering manoeuvres have relatively small and slow steering input torques applied and the steering valve means reacts (opens) to a small extent to direct a relatively small proportion of fluid pressure flow to a ram chamber so that the fluid pressure differential between the two ram chambers will not normally achieve a magnitude sufficient to cause the by-pass valve means to react and decrease the fluid flow communication between the opposed ram chambers.

It is preferred that the by-pass means comprises a fluid restrictor through which fluid flow communication between the opposed chambers is effected and such valve means is responsive to the fluid pressure differential as detected across the restrictor.

Preferably the by-pass valve means has a first valve which is adjustable in response to variations in vehicle speed to increase or decrease the fluid flow communication between the ram chambers and a second valve which is responsive to the fluid pressure differential between the ram chambers and reacts when the predetermined fluid pressure differential is exceeded to direct a control fluid pressure to the first valve. The control fluid pressure serves to bias the first valve for adjustment thereof in a sense to decrease the fluid flow communication between the opposed chambers. The first valve may have a control member, the position of which is adjustable in response to variations in vehicle speed (such control member being adjustable, for example, by the output from an electrical solenoid, stepper motor or other controller that reacts to a vehicle speed sensor) and a valve member which, normally, is adjustable in unison with the control member and determines the fluid flow communication which is to be provided between the opposed ram chambers. The valve member is biased, conveniently by spring means, to a predetermined position with respect to the control member and is capable of being displaced independently thereof; the aforementioned control fluid pressure may serve to displace the valve member with respect to the control member against the biasing therebetween for adjustment of the valve member to decrease the fluid flow communication between the ram chambers. The fluid flow communication between the opposed ram chambers may be provided by way of a restrictor as aforementioned which is conveniently located in the valve member. The second valve of the by-pass valve means is responsive to the fluid pressure differential between the opposed ram chambers and preferably such fluid pressure differential is determined at opposite ends of the restrictor. The second valve may comprise a displaceable valve element which is spring biased to a neutral condition in which no control fluid pressure is provided to bias the first valve; the valve element is subjected to fluid pressures which are indicative of those in the opposed ram chambers to provide a fluid pressure differential on the valve element and when that fluid pressure differential corresponds to a fluid pressure differential between the opposed chambers which exceeds the predetermined fluid pressure differential, the valve element is displaced to direct the control fluid pressure to bias the first valve in the sense to decrease the fluid flow communication between the opposed chambers. The control fluid pressure will usually be directed by the second valve to an expansible chamber of the first valve to effect expansion of that chamber and adjustment of the first valve to decrease the fluid flow communication between the opposed chambers.

The present invention was primarily developed for steering systems of the rack and pinion type but it will be realised that it may readily be applied to other types of steering systems the power assistance servo motor for which is in the form of a double acting fluid pressure operated ram.

DRAWINGS

One embodiment of a power assisted vehicle steering system constructed in accordance with the present invention will now be described, by way of example only, with reference to the accompanying illustrative drawings, in which:

FIG. 1 diagrammatically illustrates the system, particularly the ram and by-pass valve means while conventional components of the system are shown in schematic form—in this figure the by-pass valve means is in a condition to close fluid flow communication between the ram chambers;

FIG. 2 illustrates the ram and by-pass valve means shown in FIG. 1 and with the by-pass valve means being adjusted in response to an increase in vehicle speed to open fluid flow communication between the ram chambers;

FIG. 3 illustrates the ram and by-pass valve means shown in FIG. 2 with the by-pass valve means reacting while the vehicle is at high speed and in a sense to make available power assistance at such speed, and FIG. 4 illustrates the ram and by-pass valve means, the latter reacting under similar circumstances to that shown in FIG. 3 but in response to a steering manoeuvre in an opposite sense of direction from that intended in FIG. 3.

DETAILED DESCRIPTION OF DRAWINGS

Figure 1:
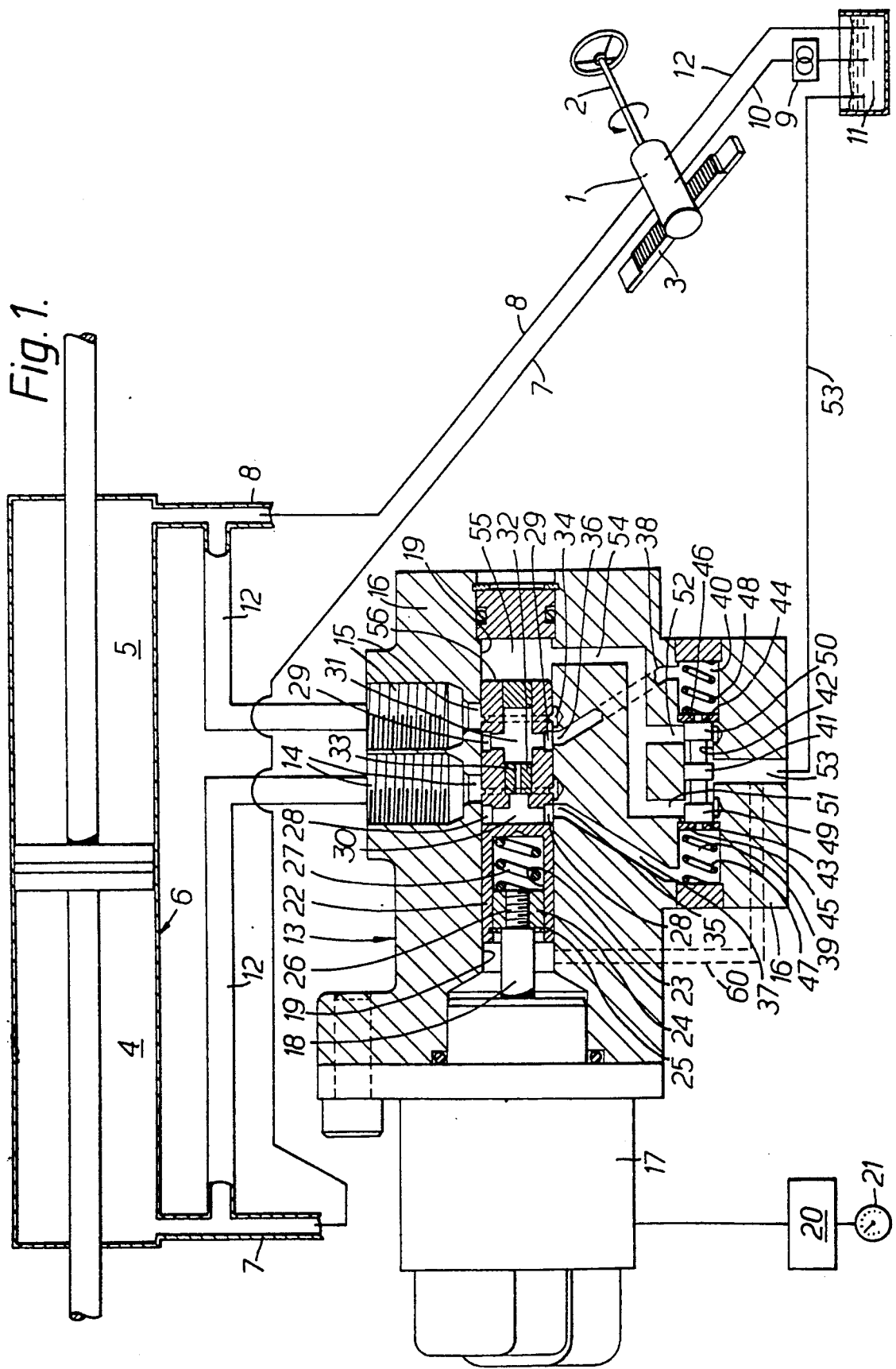

The power assisted vehicle steering system illustrated is conveniently applied to a steering gear of the rack and pinion type and in FIG. 1 is shown to include a conventional steering valve 1 of the rotary spool type having open centre/open return characteristics in its neutral condition and adjustment of which is effected by a steering input torque applied through a steering column 2. Rotation of the column 2 impacts rotation to a pinion engaging a rack bar 3 to impact longitudinal displacement to the rack bar, the latter being incorporated in a steering linkage in a conventional manner to effect a steering manoeuvre. The steering valve 1 controls fluid flow respectively to and from opposed chambers 4 and 5 of a double acting piston and cylinder device or ram 6 by way of feed conduits 7 and 8 respectively to provide a fluid pressure differential between the chambers 4 and 5 to actuate the ram 6. The ram is coupled so that its operation assists in longitudinal displacement of the rack bar 3 to provide power assistance in conventional manner to the steering manoeuvre intended by a steering input applied to the column 2. Fluid pressure for the system is provided by a constant volume pump 9 the output from which communicates with the valve 1 through a conduit 10 and which derives hydraulic fluid from a reservoir 11. The valve 1 is provided with a fluid return line 12 to the reservoir. For convenience, the pump, reservoir, steering valve and rack and pinion components have been omitted from FIGS. 2 to 4.

Communicating between the conduits 7 and 8 and therethrough with the ram chambers 4 and 5 is a by-pass conduit 12 through which fluid flow communication is possible between the ram chambers. Located in the conduit 12 to control fluid flow therethrough is a by-pass valve assembly 13 having a housing 16 with ports 14 and 15 which communicate through the conduit 12 to ram chambers 4 and 5 respectively.

Mounted on the housing 16 of the by-pass valve assembly is an electric stepper motor or a solenoid 17 operation of which effects in axial displacement of a control rod 18 that projects co-axially into a spool cylinder 19 of the housing 16. A controller 20 determines operation of the solenoid 17 in response to signals derived from a vehicle speed sensor 21. Axially displaceable in the cylinder 19 is a valve spool 22, one end of which is provided with a coaxial blind bore 23. Axially slidable within the bore 23 is a thrust plate 24 which is retained within the bore 23 by an annular stop 25 (such as a circlip) and is screw threadedly connected at 26 to the free end of the control rod 18 for axial displacement in unison therewith. Reacting in the blind bore 23 between the thrust plate 24 and the blind end of that bore is a spring 27 which biases the spool 22 axially with respect to the thrust plate 24 and into a position that is determined by abutment of the plate 24 against the stop 25.

Provided in the external cylindrical surface of the spool 22 are two axially spaced annular ports 28 and 29. The recess 28 communicates with a fluid passage 30 extending radially through the spool and the recess 29 communicates with a passage 31 also extending radially through the spool. Located axially between the passages 30 and 31 is a fluid flow restrictor 32 having a control orifice 33 which provides fluid flow communication between the passages 30 and 31. The annular ports 28 and 29 control the opening and closing of fluid flow communication between the ports 14 and 15 respectively in the spool cylinder 19 during axial displacement of the spool 22 relative to the housing 16 For the purpose of radially balancing the spool 22 in its cylinder, annular channels 34 are provided in the cylindrical surface of the spool to communicate with the ports 14 and 15 respectively so that when those ports are subjected to fluid pressure such pressure will be applied locally between the circumference of the spool and its cylinder.

In constant communication one each with the annular ports 28 and 29 are ports 35 and 36 respectively in the spool cylinder 19. The ports 35 and 36 communicate through internal passages 37 and 38 respectively to coaxial cylindrical pressure chambers 39 and 40 respectively located coaxially with and at opposite ends of a second spool 41 that is axially displaceable in a spool cylinder 42 in the housing 16.

The spool 41 is symmetrical about its axial centre and is provided with equal and opposed end faces 43 and 44 which, in a neutral condition of the spool, abut annular thrust plates 45 and 46 respectively. The annular plates 45 and 46 are complementary to and axially slidable in the pressure chambers 39 and 40 respectively. Springs 47 and 48 are provided in the chambers 39 and 40 respectively to react against the respective annular plates 45 and 46 and bias those plates relative to the housing 16 and towards or into abutment with the spool end faces 43 and 44 respectively. The spool 41 has end lands 49 and 50 which control axially spaced ports 51 and 52 respectively in the spool cylinder 42 for communication of those ports with a low pressure passage 53 (that communicates with the reservoir 11) or to open communication between either one of the port 51 or the port 52 and the pressure chamber 39 or 40 adjacent that port as the case may be while closing communication between both ports 51 and 52 and the passage 53. The ports 51 and 52 communicate by way of internal passage 54 with an expansible chamber 55 in the spool cylinder 19. The chamber 55 is formed at the axial end of the spool cylinder 19 remote from the control rod 18 and is partly defined by an end face 56 of the spool 22.

The arrangement of the system shown in FIG. 1 is intended to correspond with the vehicle being stationary or moving at relatively slow speed, say less than 30 kph, and the control rod 18 is adjusted by the solenoid 17 to the position shown in the Figure whereby the spool 22 closes both ports 14 and 15 and no fluid flow communication is possible between the ram chambers through the by-pass 12. Consequently during a steering manoeuvre with the vehicle moving the low speed range mentioned, the steering valve 1 in response to a steering input torque directs fluid flow from the pump 9 to one of the ram chambers 4 and 5 while the other ram chamber is opened to return to reservoir thereby providing a fluid pressure differential between the ram chambers to actuate the ram and provide power assistance to the intended steering manoeuvre in the usual manner. It will be appreciated that the amount of power assistance provided will be determined, in part, by the extent of which the steering valve is opened from its neutral condition to provide communication between the pump 9 and the appropriate expanding ram chamber 4 or 5. When the steering valve is fully opened in response to a large steering input torque the full output of the pump 9 will be directed to the expanding ram chamber to provide maximum power assistance.

If the vehicle speed is increased progressively beyond the aforementioned low range the controller 20 responds to signals from the sensor 21 to actuate the solenoid 17 and displace the control rod 18 axially rightwardly in FIG. 1. This effects in axial displacement of the spool 22 rightwardly in FIG. 1 through the biasing force exerted on the spool by the spring 27 so that the annular recesses 28 and 29 are progressively opened to communicate with the ports 14 and 15 respectively as shown in FIG. 2.

Figure 2:
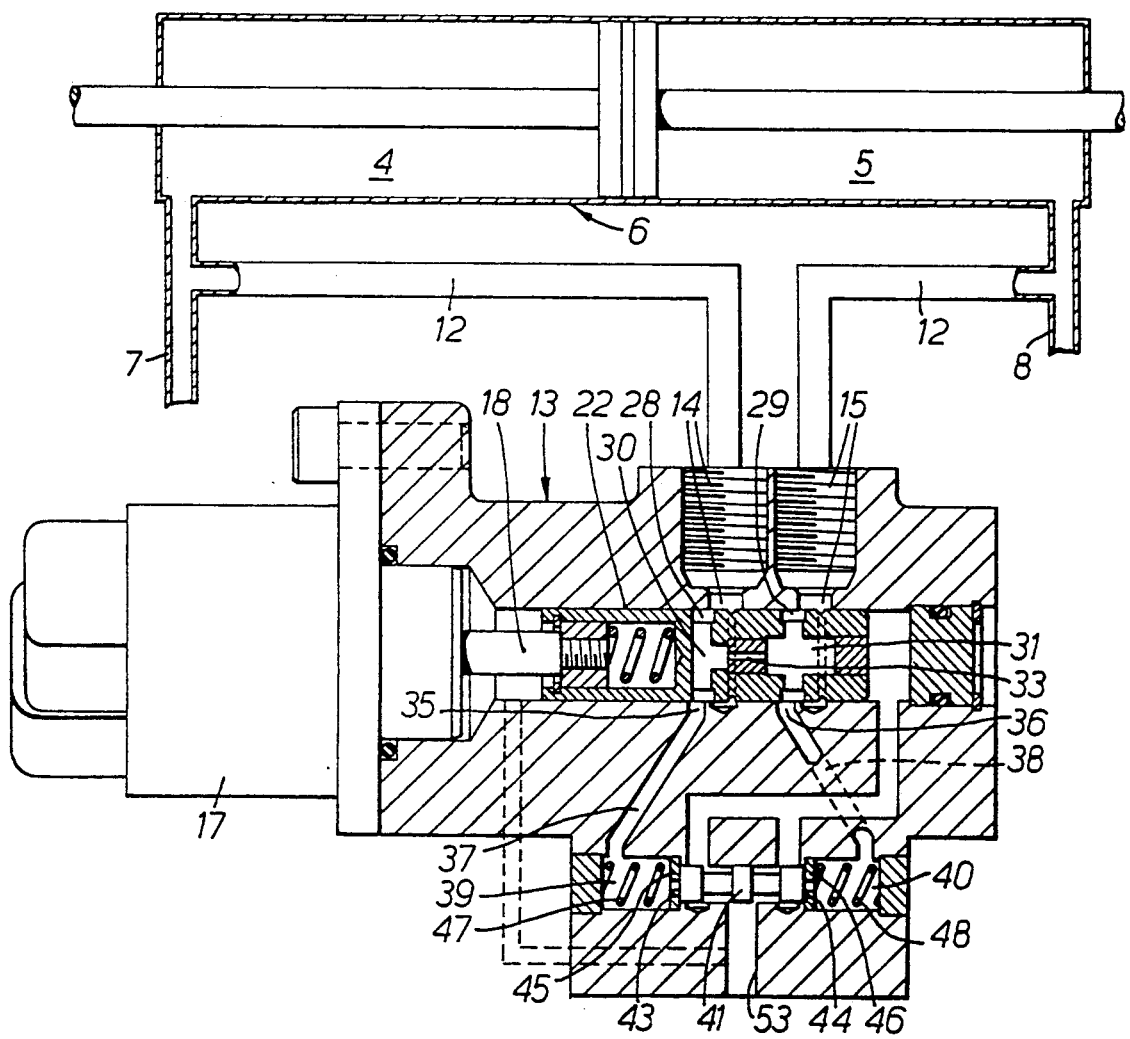

With the spool 22 adjusted to the position shown in FIG. 2 fluid flow communication is provided between the ram chambers 4 and 5 by way of the by-pass 12, ports 14 and 15, annular recess ports 28 and 29, radial passages 30 and 31 and the control orifice 33 of the restrictor. Consequently when the steering valve 1 is adjusted in response to a steering input torque, a proportion of the pressurised fluid which is directed from the pump 9 to the expanding ram chamber can bleed by way of the by-pass passage 12 and the valve assembly 13 to return to the reservoir 11 and thereby reduce power assistance which is available. As the spool 22 is displaced rightwardly in FIG. 2 progressively opening the annular recesses 28 and 29 to the ports 14 and 15 respectively, greater fluid flow is permitted to pass to the control orifice 33 and a progressive reduction in power assistance will result as vehicle speed increases during the range of, say, 30 kph to 80 kph. At speeds above say 80 kph, the control rod 18 may maintain the axial position of the spool 22 substantially constant with maximum communication provided between the ports 14 and 28 and also between the ports 15 and 29 so that maximum fluid flow can be provided by way of the control orifice 33 and minimum power assistance will be available.

As the vehicle speed increase as aforementioned and the spool 22 is adjusted to the position shown in FIG. 2 it will be seen that whichever of the ram chambers 4 and 5 is subjected to fluid pressure from the steering valve, such fluid pressure will be reflected in the pressure chamber 39 or 40 (whichever connects with the pressurised ram chamber by way of the port 35 and conduit 37 or port 36 and conduit 38). Consequently the second spool 41 will be subjected across its end faces 43 and 44 is a fluid pressure differential which is a reflection of that in the ram chambers 4 and 5 and is detected at opposite sides of the control orifice 33 in the radial passages 30 and 31 respectively. Experience indicates that during steering at relatively high vehicle speeds, relatively small steering input torques are normally applied to the steering valve 1 (for example as would occur during steering of a vehicle around long curves as are encountered during motorway driving or when overtaking) so that for normal steering the valve 1 will be only partially displaced or opened from its neutral condition and the full output from the pump 9 is not made available to actuate the ram. Accordingly a relatively small pressure differential only would normally be applied between the ram chambers 4 and 5. As previously explained, this pressure differential is reflected in the pressure chambers 39 and 40. For the second spool 41 to be displaced axially from its neutral condition shown in FIGS. 1 and 2 it is necessary that the pressure differential exhibited between fluid passage in the chambers 39 and 40 on the spool end faces 43 and 44 is sufficient to displace the spool axially against one or other of the biasing springs 47 and 48 on the annular plates 45 and 46 and the springs 47 and 48 are selected to maintain the spool 41 in its neutral position under the aforementioned "normal" steering conditions.

It will be appreciated from FIG. 2 that similar circumstances apply where the ram chamber 4 is subjected to fluid pressure and the ram chamber 5 is open to the fluid reservoir or vice versa and also that as the vehicle speed decreases the control rod 18 will be displaced leftwardly in the Figure by the solenoid 17 to displace the spool 22 leftwardly (by abutment through the stop 25) and the system reverts to the condition shown in FIG. 1 whereby maximum power assistance becomes available for a steering manoeuvre.

If the vehicle is at high speed, say about 30 kph as previously mentioned, so that the system is in the condition shown in FIG. 2 and it is assumed that a large steering input torque is rapidly applied to the steering valve 1 to effect a steering manoeuvre, possibly to avoid an unexpected road hazard, the system will react in a manner to increase the power assistance which is available (possibly to provide maximum power assistance) and irrespective of the axial position to which the control rod 18 is adjusted for the vehicle speed at the relevant time. This reaction will be as shown in either FIG. 3 or FIG. 4.

Figure 3:
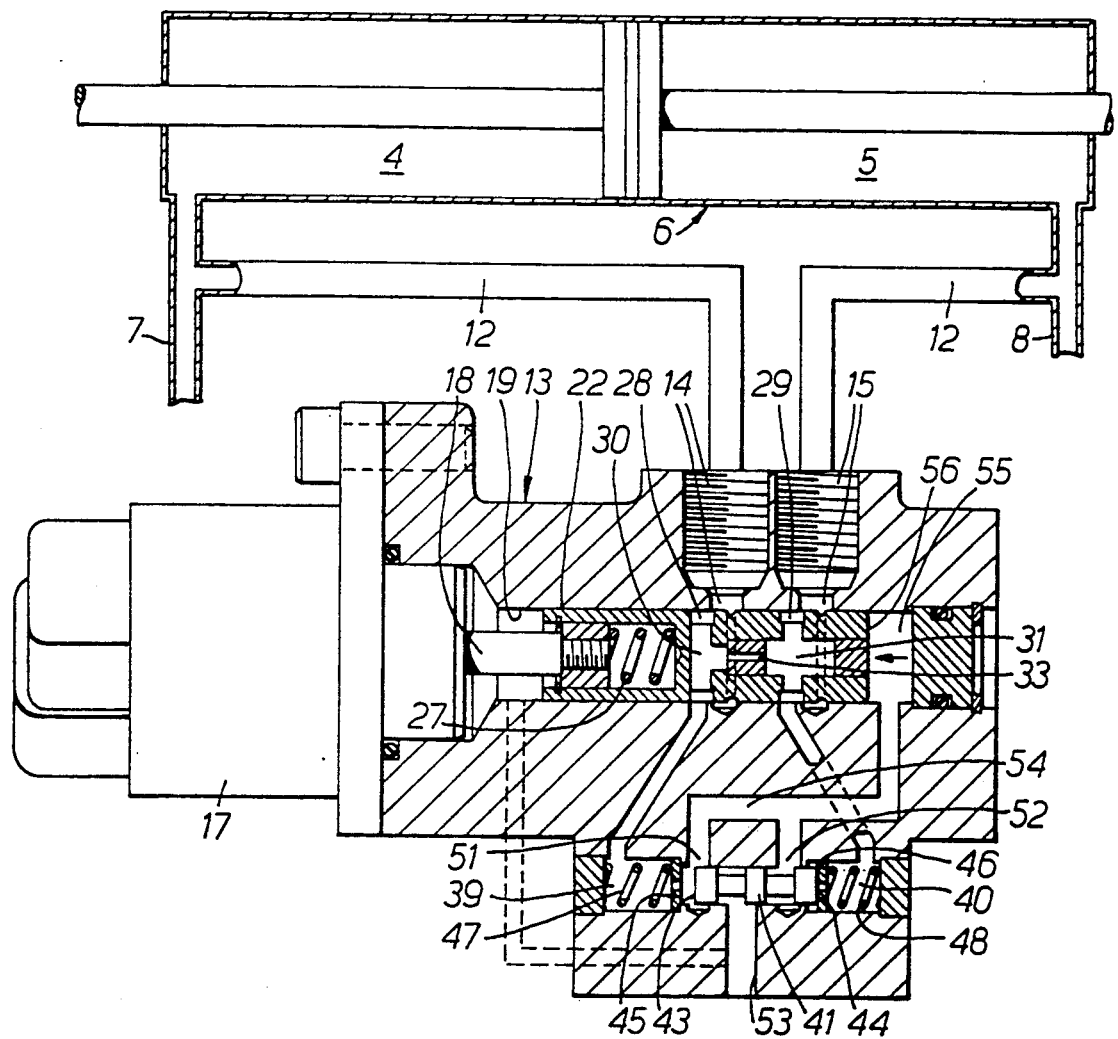

In FIG. 3 it is assumed that with the vehicle at high speed an abnormally large steering input torque has been applied to the steering valve which is sufficient to open that valve and direct the whole (or a major part) of the fluid pressure available from the pump 9 to the ram chamber 4 while the ram chamber 5 communicates with the fluid reservoir. The effect of this is to create a rapid and large pressure differential between the chambers 4 and 5 and a correspondingly large pressure differential across the control orifice 33 (in the radial passage 30 and 31) and in the pressure chambers 39 and 40 of the second valve 41. The pressure differential which is thus applied across the end faces 43 and 44 of the spool 41 is larger than what may be regarded as a predetermined pressure differential (which is that required to be applied across the spool end faces immediately prior to the spool 41 exhibiting axial displacement against the biasing of one or other of the springs 47 and 48). In the condition shown in FIG. 3 the high fluid pressure in the pressure chamber 39 and low fluid pressure is the chamber 40 applies a pressure differential across the spool end faces 43 and 44 to cause the spool 41 to be displaced rightwardly against the force exerted by the biasing spring 48 on the spool end face 44 through the annular plate 46. As a consequence of this spool displacement the port 51 is closed to communication with the passage 53 to reservoir and opened to communication with fluid pressure in the pressure chamber 39 by way of the central aperture in the annular plate 45 (which latter plate is held in abutment against a shoulder at the end of the chamber 39 by the biasing spring 47). Simultaneously the port 52 is maintained closed by the spool 41 to communication with the passage 53 to the reservoir. Fluid pressure therefore is made available, by way of port 51 and passage 54, to provide a control pressure to the expansible chamber 55 (at the righthand end of the spool cylinder 19) which is applied to the spool end face 56. Such a control pressure on the spool end face 56 causes the spool 22 to be displaced leftwardly in the drawing and relative to the control rod 18 against the biasing of spring 27. As the spool 22 is displaced leftwardly in FIG. 3 the annular ports 28 and 29 are progressively closed to communication with the ports 14 and 15 respectively thereby progressively closing fluid flow communication by way of the by-pass 12 between the ram chambers 4 and 5. Consequently an increasing and possibly maximum power assistance becomes available by the ram 6 to assist the intended steering manoeuvre. If vehicle speed is maintained following the steering manoeuvre then fluid pressure in the ram chamber 4 reduces to what may be regarded as a normal condition for high speed steering manoeuvres and the pressure differential across the spool end faces 43 and 44 decreases thereby permitting the system to revert to that shown in FIG. 2.

Figure 4:
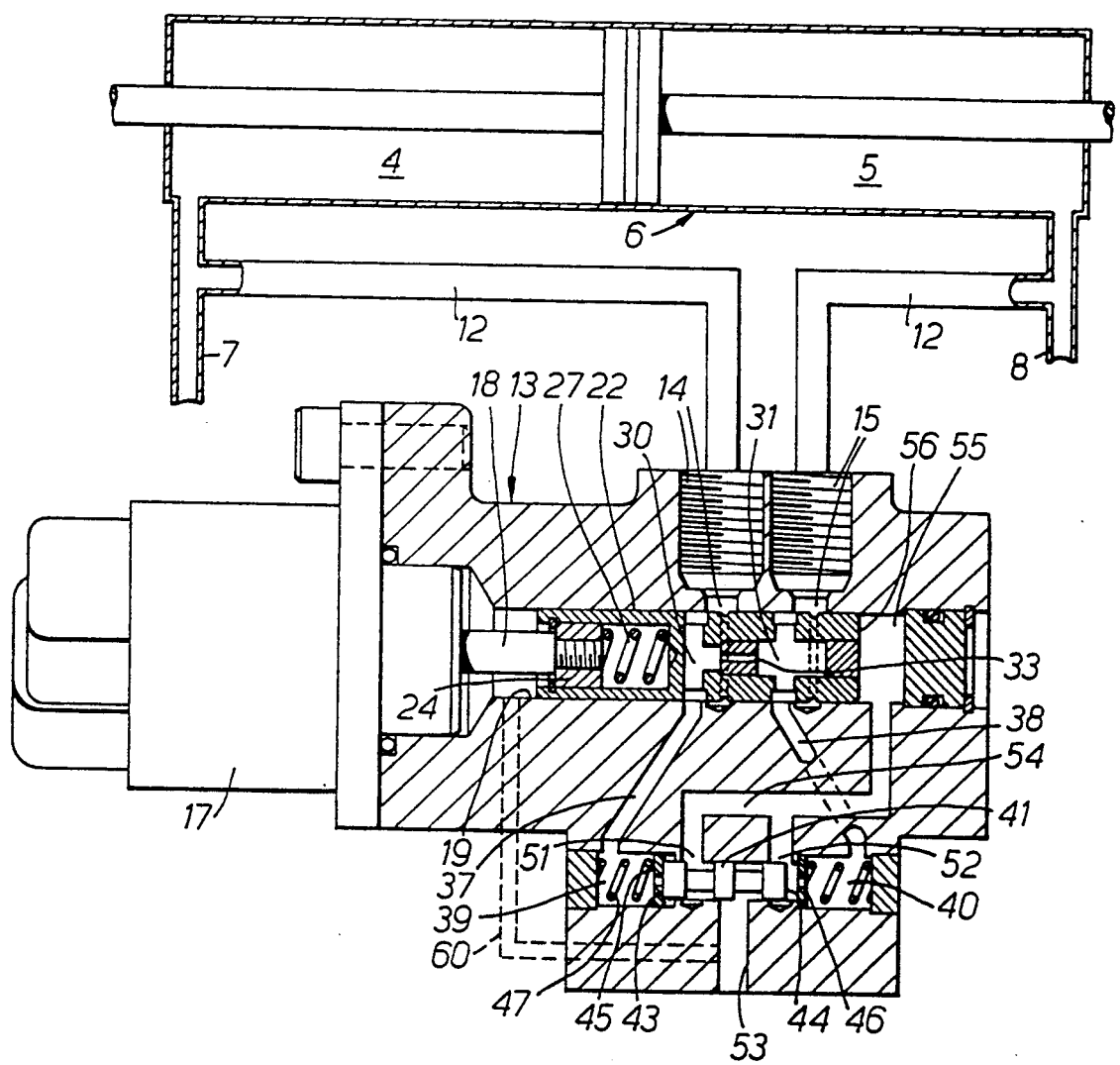

If the abnormal steering manoeuvre at high speed as discussed above with reference to FIG. 3 is in an opposite sense whereby the ram chamber 5 is subjected to fluid pressure and the ram chamber 4 is open to reservoir, the by-pass valve assembly reacts similarly to that described but with the pressure differential across the spool faces 43 and 44 being applied so that the spool 41 is displaced leftwardly as shown in FIG. 4. This opens port 52 to communication with high pressure fluid in the pressure chamber 40 by way of the central aperture in the annular plate 44 (which plate is retained against a stop at the end of the chamber 40 by the biasing of the spring 48) while the port 51 is maintained closed to communication with the passage 53 to the reservoir (and the annular plate 45 is displaced leftwardly against the biasing of spring 47 by abutment of the spool end face 43 on that plate 45). Consequently, a control pressure is applied from the port 52 by way of passage 54 to the expansible chamber 55 to bias and displace the spool 22 leftwardly relative to the spool rod 18 in a similar manner to that discussed with reference to FIG. 3—a- gain providing increased power assistance from the ram.

To alleviate fluid pressure build up in the spool cylinder 19 at the end of the spool 22 remote from the chamber 55 (caused by possible fluid leakage along the spool 22), a drainage passage 60 is provided to communicate with passage 53 to the fluid reservoir.

In the event that the spool 22 becomes jammed in a position where the annular ports 28 and 29 communicate with the ports 14 and 15 respectively, reduced or no power assistance would be available when vehicle speed is reduced irrespective of whichever direction a steering input is applied. However, to alleviate this difficulty it will be seen that when a large steering input torque is applied for the valve 1 to direct a major part of, or the maximum pressure form the pump to either port 14 or port 15, a considerable pressure differential will be created across the control orifice 33 of the restrictor. This pressure differential is reflected in the pressure chambers 39 and 40 causing the second spool 41 to be displaced leftwardly or rightwardly as the case may be from its neutral position. This latter movement of spool 41 permits pressure fluid to be admitted to the expansible chamber 55 where it exerts a large axial force on the spool 22 in an attempt to overcome the jam and displace the spool 22 to close the ports 14 and 15. If an electrical failure should occur to the solenoid 17 with the spool 22 in a position where ports 14 and 15 communicate with each other by way of the restricted orifice 33, the system will react similarly to that mentioned above to displace the spool 41 and direct pressure fluid to the chamber 55 to displace the spool 22 to a condition where ports 14 and 15 are closed and maximum power assistance becomes available.

It will be realised that the biasing springs 47 and 48 for the second spool 41 will be selected and balanced with respect to the size of the restricted orifice 33 to ensure that the spool 41 will be displaced from its neutral position to admit the control pressure fluid to the chamber 55 when a predetermined pressure differential across the control orifice 33 is exceeded.

Although the steering valve 1 is referred to as having open centre/open return characteristics it will be appreciated that such valve could be provided with closed centre characteristics as is know in the art.

I claim:

1. A power assisted vehicle steering system comprising a fluid pressure operated ram having opposed chambers and operable to provide assistance to vehicle steering; steering valve means responsive to a steering input and controlling fluid flow from a pressure source to said opposed chambers to provide a fluid pressure differential therebetween and actuate the ram for assisting in a steering maneuver intended by the steering input; a by-pass capable of providing fluid flow communication between said opposed chambers and by-pass valve means controlling said fluid flow communication, said by-pass valve means being adjustable in response to variations in vehicle speed to increase said fluid flow communications as vehicle speed increases and to decrease said fluid flow communication as vehicle speed decreases, and wherein said by-pass valve means is responsive to the fluid pressure differential between the opposed chambers whereby when a predetermined fluid pressure differential is exceeded the by-pass valve means reacts, independently of its adjustment in response to vehicle speed, to decrease fluid flow communication between the opposed chambers, said by-pass valve means comprising a first valve adjustable in response to said variations in vehicle speed to increase or decrease said fluid flow communication and a second valve which is responsive to said fluid pressure differential and reacts when said predetermined fluid pressure differential is exceeded to direct a control fluid pressure to said first valve, said control fluid pressure serving to bias the first valve for adjustment thereof to decrease the fluid flow communication between the opposed chambers.

2. A system as claimed in claim 1 in which the by-pass valve means comprises a fluid restrictor through which fluid flow communication between said opposed chambers is effected and wherein the by-pass valve means is responsive to the fluid pressure differential as detected across said restrictor.

3. A system as claimed in claim 1 in which the first valve comprises a control member the position of which is adjustable in response to variations in vehicle speed and a valve member which is adjustable in unison with said control member and determines the fluid flow communication between the opposed chambers, and wherein the valve member is biased to a predetermined position with respect to the control member to be adjustable independently thereof and said control fluid pressure serves to displace the valve member with respect to the control member against the biasing therebetween for adjusting the valve member to decrease said fluid flow communication.

4. A system as claimed in claim 3 in which the valve member is biased with respect to the control member by spring means.

5. A system as claimed in claim 3 in which the by-pass valve means comprises a fluid restrictor through which fluid flow communication between said opposed chambers is effected and the by-pass valve means is responsive to the fluid pressure differential as detected across said restrictor, and wherein said restrictor is carried by said valve member.

6. A system as claimed in claim 1 in which the by-pass valve means comprises a fluid restrictor through which fluid flow communication between said opposed chambers is effected and the by-pass valve means is responsive to the fluid pressure differential as detected across said restrictor and wherein the restrictor is located in said first valve.

7. A system as claimed in claim 1 in which the vehicle speed responsive means comprises a solenoid.

8. A system as claimed in claim 1 in which the by-pass valve means comprises a fluid restrictor through which fluid flow communication between said opposed chambers is effected, and wherein the second valve is responsive to said fluid pressure differential between the opposed chambers and which fluid pressure differential is determined across said restrictor.

9. A system as claimed in claim 1 in which the second valve comprises a displaceable valve element which is spring biased to a neutral condition in which no control fluid pressure is provided to bias the first valve and wherein said valve element is responsive to the fluid pressure differential between the opposed chambers so that when the predetermined fluid pressure differential is exceeded, the valve element is displaced from its neutral condition and against its biasing to direct the control fluid pressure to bias the first valve to decrease fluid flow communication between the opposed chambers.

10. A system as claimed in claim 1 in which the control fluid pressure is directed by the second valve to an expansible chamber of the first valve whereby expansion of that chamber effects in said adjustment of the first valve to decrease the fluid flow communication between the opposed chambers.

11. A system as claimed in claim 1 in which the first valve comprises a first spool axial adjustment of which controls fluid flow communication between the opposed chambers and the second valve comprises a second spool axial adjustment of which controls the control fluid pressure which is directed to the first valve.

12. A system as claimed in claim 1 in which at vehicle speeds below a predetermined vehicle speed the by-pass valve means closes fluid flow communication between the opposed chambers.

13. A system as claimed in claim 1 and comprising vehicle speed responsive control means for effecting in adjustment of the by-pass valve means.

14. A system as claimed in claim 13 in which the vehicle speed responsive means comprises an electrical stepper motor.

* * * * *